(12) United States Patent
Plow

(10) Patent No.: US 12,726,229 B2
(45) Date of Patent: Sep. 1, 2026

(54) SYSTEM AND METHOD FOR POWER LINE COMMUNICATIONS OVER A STANDARD TRACTOR-TRAILER ELECTRICAL CONNECTION

(71) Applicant: Bendix Commercial Vehicle Systems LLC, Avon, OH (US)

(72) Inventor: William R. Plow, Avon, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 754 days.

(21) Appl. No.: 18/179,063

(22) Filed: Mar. 6, 2023

(65) Prior Publication Data

US 2024/0305333 A1 Sep. 12, 2024

(51) Int. Cl.

| | |
|---|---|
| ***H04B 3/54*** | (2006.01) |
| ***H01R 13/02*** | (2006.01) |
| *B60D 1/64* | (2006.01) |

(52) U.S. Cl.

CPC ............... *H04B 3/54* (2013.01); *H01R 13/02* (2013.01); *B60D 1/64* (2013.01); *H01R 2201/26* (2013.01)

(58) Field of Classification Search

CPC ... H04B 3/54; B60D 1/62; B60D 1/64; H01R 31/065; B60R 16/03

USPC .......................................................... 375/257

See application file for complete search history.

(56) References Cited

U.S. PATENT DOCUMENTS

| | | | | |
|---|---|---|---|---|
| 10,780,818 B2 | | 9/2020 | Foster | |
| 2003/0195668 A1* | | 10/2003 | Radtke | H04B 3/548 701/1 |
| 2010/0080306 A1* | | 4/2010 | Fukuda | H04B 3/544 375/257 |
| 2011/0234388 A1* | | 9/2011 | Lesesky | B60T 13/66 701/71 |
| 2020/0338941 A1* | | 10/2020 | Slade | B60D 1/62 |

* cited by examiner

*Primary Examiner* — Benyam Haile

(74) *Attorney, Agent, or Firm* — Reising Ethington P.C.

(57) ABSTRACT

A system for transmitting and receiving communications formed using different communication protocols between members of a tractor-trailer over an SAE J560 standard electrical connection includes one or more communication hubs. Each hub includes one or more power converters, one more power line communication codec and a controller. The controller establishes one or more communication networks between members of the tractor-trailer over different pairs of conductors in the electrical connection and controls the power converters to covert power signals transmitted over the networks between direct current waveforms and alternating current waveforms. The controller controls the codecs to transmit communications over the communication networks by encoding and decoding communications over the alternating current waveforms thereby allowing the transfer of communications having different communication protocols between members of the tractor-trailer.

23 Claims, 6 Drawing Sheets

SYSTEM AND METHOD FOR POWER LINE COMMUNICATIONS OVER A STANDARD TRACTOR-TRAILER ELECTRICAL CONNECTION

BACKGROUND OF THE INVENTION a. Field of the Invention

This invention relates to communications systems used in vehicles such as tractor-trailers. In particular, the invention relates to a system and method for transmitting power and for transmitting and receiving communications formed using different communication protocols between members of a tractor-trailer over a SAE J560 standard electrical connection.

b. Background Art

Conventional tractor-trailers include electrical connections between members of the tractor-trailer (i.e., tractors, trailers and dollies) to enable passage of electrical signals between the members. These signals are used to provide power to and to control various systems on the members (e.g., lighting systems on the trailer) and to transfer data between members (e.g., relating to anti-lock braking and/or stability control). Many conventional tractor-trailers have an electrical connection that complies with an international standard promulgated by the Society of Automotive Engineers (SAE) in publication SAE J560 "Primary and Auxiliary Seven Conductor Electrical Connector for Truck-Trailer Jumper Cable" (hereinafter SAE J560 Standard). Under the SAE J560 Standard, the electrical connection includes seven (7) different conductors or lines for passage of electrical signals between members of the tractor-trailer. Referring to FIG. 1, each member of the tractor trailer includes one or more connectors in the form of a receptacles 10 having seven pins 12 (numbered 1-7) that are coupled to corresponding conductors such as wires on the member. A wire harness 14 having plugs 16 at either end that are received in receptacles 10 can be used to establish an electrical connection between members of the tractor-trailer to allow transfer of electrical signals between members of the tractor-trailer. Each plug 16 has seven sockets 18 (again numbered 1-7) configured to receive corresponding pins 12 of a receptacle 10. The function of each conductor is set forth in the table below:

| Conductor | Function |
|---|---|
| 1 | ground return |
| 2 | clearance, side and identification lamps |
| 3 | left turn signal and hazard lamps |
| 4 | stop lamps and antilock braking system (ABS) (secondary power) |
| 5 | right turn signal and hazard lamps |
| 6 | trail and license plate, clearance and/or side marker lamps |
| 7 | continuous antilock braking system (ABS) power/ auxiliary devices |

In recent years an ever-increasing number of electrical systems have been added to various members of the tractor-trailer to provide features relating to safety, advanced driver assistance and operator comfort and convenience including, for example, rear and side object detection and warning systems. These systems communicate among components (e.g., sensors, actuators, controllers) mounted on an individual member of the tractor-trailer over a variety of different electrical communication buses (sometimes referred to herein as intra-member communication networks) using a variety of different communication protocols. In many cases it is desirable for systems on one member of the tractor-trailer to be able to communicate with systems on another member of the tractor-trailer. The ability of systems on different members of the tractor-trailer to communicate with one another, however, has been limited by the physical and functional limitations of the SAE J560 electrical connection between members of the tractor-trailer. Although communication could be facilitated through replacement of the SAE J560 electrical connection with a more robust electrical connection or by adding additional electrical connections between members of the tractor-trailer, doing so would incur significant costs and vehicle downtime and the industry continues to rely principally on the existing SAE J560 electrical connection due to its reliability, familiarity and extensive prior use with the industry.

In addition to the limitations on transmitting communications between members of the tractor-trailer using conventional SAE J560 electrical connections discussed above, conventional SAE J560 electrical connections have other drawbacks. First, the power transferred across each connection typically decreases due to line losses resulting from high current flow. As a result, in a tractor-trailer have multiple trailers, an initial direct current voltage of 14.2 Volts generated by a battery or other power source in the tractor may be reduced to as low as 8 or 9 Volts by the time it reaches the last trailer. Second, the SAE J560 electrical connection sometimes fails to reliably transmit conventional power line communications across the connection when the connection is towards the end of a series of similar connections in a tractor-trailer with many members due to the number connections and/or the physical length of the signal path.]

The inventors herein have recognized a need for a system for transmitting power and for transmitting and receiving communications formed using different communication protocols between members of a tractor-trailer that will minimize and/or eliminate one or more of the above-identified deficiencies.

BRIEF SUMMARY OF THE INVENTION

This invention relates to communications systems used in vehicles such as tractor-trailers. In particular, the invention relates to a system and method for transmitting power and for transmitting and receiving communications formed using different communication protocols between members of a tractor-trailer over a SAE J560 standard electrical connection.

Embodiment of a system in accordance with the teachings disclosed herein include one or more communication hubs. Each communication hub is configured for transmitting and receiving communications formed using a plurality of different communication protocols between first and second members of a tractor-trailer over an electrical connection between the first and second members of the tractor-trailer, the electrical connection configured to comply with the electrical requirements of the SAE J560 standard as it exists on the filing date of this application. It should be understood that the phrase "electrical requirements of the SAE J560 standard as it exists on the filing date of this application" as used herein does not exclude electrical connections that comply with electrical requirements of the SAE J560 standard as the standard may be revised in the future so long as the electrical connections also comply with the electrical requirements of the SAE J560 standard as it exists on the filing date of this application (i.e., the electrical connection is backwards compatible).

In one embodiment, the communications hub a housing configured for mounting on the first member of the tractor-trailer. The communications hub further includes a first communication interface supported on the housing and configured for connection with the electrical connection between the first and second members of the tractor-trailer. The communications hub further includes a second communication interface supported on the housing and configured to transmit and receive communications over a first intra-member communication network on the first member of the tractor-trailer in accordance with a first communication protocol. The communications hub further includes a power converter supported within the housing, a power line communication codec supported within the housing, and a controller supported within the housing. The controller is configured to establish a first inter-member communication network between the first and second members of the tractor-trailer over first and second conductors of the electrical connection. The controller is further configured to control the power converter to convert a power signal transmitted between the first and second members of the tractor-trailer over the first inter-member communication network between a direct current waveform and an alternating current waveform. The controller is further configured to control the power line communication codec to encode and decode communications over the alternating current waveform and exchange communications between the second communication interface and the second member of the tractor-trailer over the first inter-member communication network.

In another embodiment, the communications hub includes a housing configured for mounting on the first member of the tractor-trailer. The communications hub further includes a first communication interface supported on the housing and configured for connection with the electrical connection between the first and second members of the tractor-trailer. The communications hub further includes a second communication interface supported on the housing and configured to transmit and receive communications over a first intra-member communication network on the first member of the tractor-trailer in accordance with a first communication protocol. The communications hub further includes a plurality of power converters supported within the housing, a plurality of power line communication codecs supported within the housing, and a controller supported within the housing. The controller is configured to establish a plurality of inter-member communication networks between the first and second members of the tractor-trailer, each of the plurality of inter-member communication networks formed over different pairs of conductors of the electrical connection. The controller is further configured to control each of the plurality of power converters to convert a corresponding power signal transmitted between the first and second members of the tractor-trailer over a corresponding one of the plurality of inter-member communication networks between a direct current waveform and an alternating current waveform. The controller is further configured to control each of the plurality of power line communication codecs to encode and decode communications over a corresponding alternating current waveform and exchange communications between the second communication interface and the second member of the tractor-trailer over a first inter-member communications network of the plurality of inter-member communication networks.

In another embodiment, the communications hub includes a housing configured for mounting on the first member of the tractor-trailer. The communications hub further includes a first communication interface supported on the first housing and configured for connection with the electrical connection between the first and second members of the tractor-trailer. The communications hub further includes a second communication interface supported on the first housing and configured to transmit and receive communications over a first intra-member communication network on the first member of the tractor-trailer in accordance with a first communication protocol. The communications hub further includes a power converter supported within the housing and a power line communication codec supported within the housing. The communications hub further includes control means, supported within the housing, for establishing a first inter-member communication network between the first and second members of the tractor-trailer over first and second conductors of the electrical connection, controlling the power converter to convert a power signal transmitted between the first and second members of the tractor-trailer over the first inter-member communication network between a direct current waveform and an alternating current waveform, and controlling the power line communication codec to encode and decode communications over the alternating current waveform and exchange communications between the second communication interface and the second member of the tractor-trailer over the first inter-member communication network.

A method for transmitting and receiving communications formed using a plurality of different communication protocols between first and second members of a tractor-trailer over an electrical connection between the first and second members of the tractor-trailer, the electrical connection configured to comply with the electrical requirements of the SAE J506 standard as it exists on the filing date of this application, may include several steps. In one embodiment, the method includes establishing a first inter-member communication network between the first and second members of the tractor-trailer over first and second conductors of the electrical connection. The method further includes controlling a power converter to convert a power signal transmitted between the first and second members of the tractor-trailer over the first inter-member communication network between a direct current waveform and an alternating current waveform. The method further includes controlling a power line communication codec to encode and decode communications over the alternating current waveform and exchange communications between a communication interface and the second member of the tractor-trailer over the first inter-member communication network, the communication interface configured transmit and receive communications over a first intra-member communication network on the first member of the tractor-trailer in accordance with a first communication protocol.

A system and method for transmitting and receiving communications formed using different communication protocols between members of a tractor-trailer in accordance the present teachings represent an improvement as compared to conventional systems and methods. In particular, the system and method disclosed herein enable use of the existing SAE J560 electrical connection between members of a tractor-trailer to establish a plurality of different inter-member communication networks and allow transfer of communications between members of the tractor-trailer generated under a variety of different communication protocols. As a result, communications may be exchanged without replacement of, or additions to, the SAE J560 electrical connection avoiding significant cost and vehicle downtime and also retaining the benefits of a rugged form of electrical connection that is less prone to failure than other types of electrical connections and that can withstand a greater number of physical connection and disconnection cycles than other electrical connections. In addition, the system and method are able to better maintain desired voltage levels across the SAE J560 electrical connection and to prevent or avoid drops in that voltage that are compounded across multiple electrical connections. Further still, the system and method improve the reliability of conventional power line communications transmitted across the SAE J560 electrical connection by encoding the communications on an alternating current waveform.

The foregoing and other aspects, features, details, utilities, and advantages of the present invention will be apparent from reading the following description and claims, and from reviewing the accompanying drawings.

DETAILED DESCRIPTION OF THE INVENTION

Figure 2:
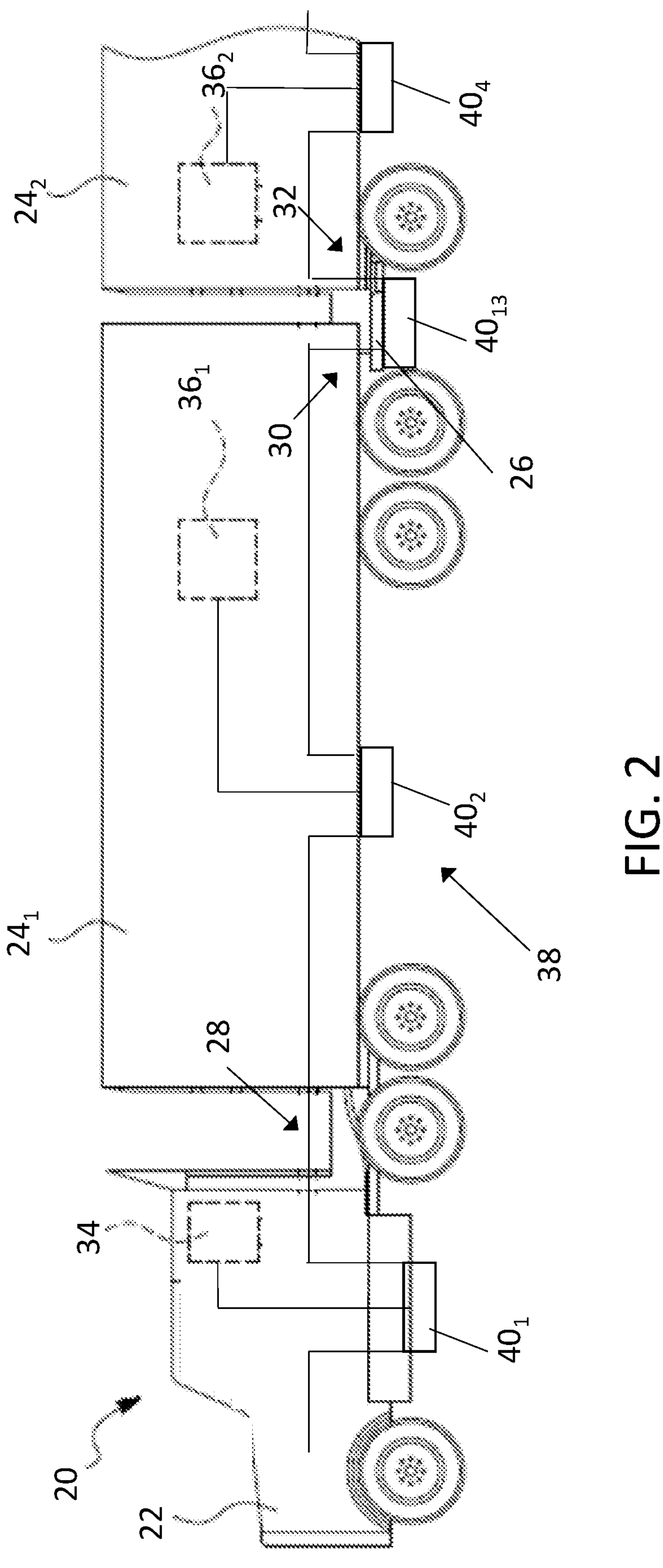
FIG. 2 is a diagrammatic view of a tractor-trailer including a one embodiment of a system for transmitting and receiving communications formed using a plurality of different communication protocols between members of the tractor-trailer over a SAE J560 electrical connection.

Referring now to the drawings wherein like reference numerals are used to identify identical components in the various views, FIG. 2 illustrates a tractor-trailer 20. Tractor-trailer 20 (also referred to as a semi) may contain several members including a truck or tractor 22, one or more trailers $\mathbf{24}_1$ . . . $\mathbf{24}_N$ and one or more dollies 26 coupling trailers $\mathbf{24}_1$ . . . $\mathbf{24}_N$. Tractor 22 contains a power unit, such as an internal combustion engine, and steering and drive axles. Tractor 22 also contains a battery (not shown) for use in starting the power unit and in providing power to various accessory systems. Trailers $\mathbf{24}_1$ . . . $\mathbf{24}_N$ are provided to store freight and are detachably coupled to tractor 22. Although a pair of trailers 24 are shown in the illustrated embodiment, it should be understood that the number of trailers 24 attached to tractor 12 may vary. Dollies 26 are provided to couple pairs of trailers $\mathbf{24}_1$ . . . $\mathbf{24}_N$.

Figure 1:
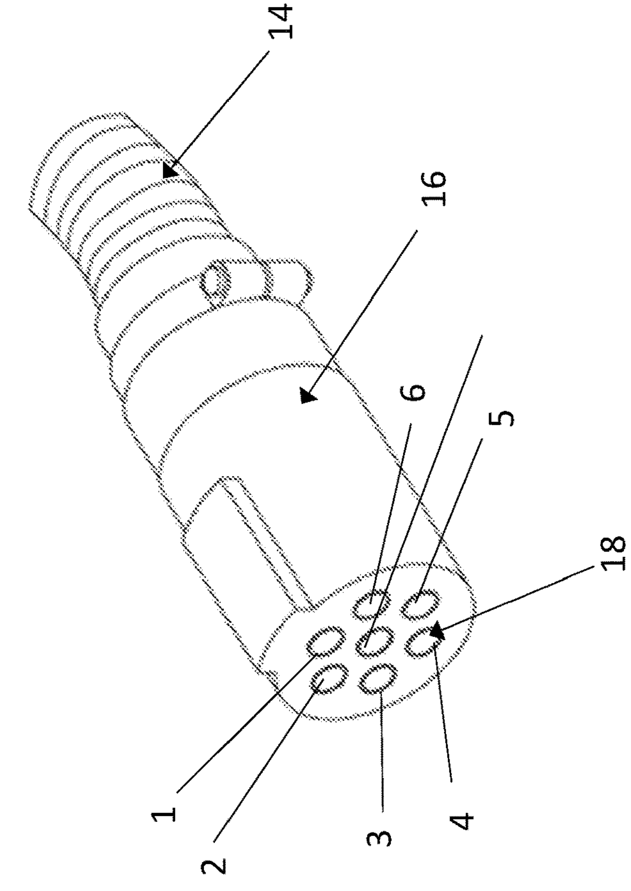
FIG. 1 is a perspective view of prior art receptacles, plugs and harnesses in compliance with the SAE J560 Standard used in conventional tractor-trailers.
Figure 1:
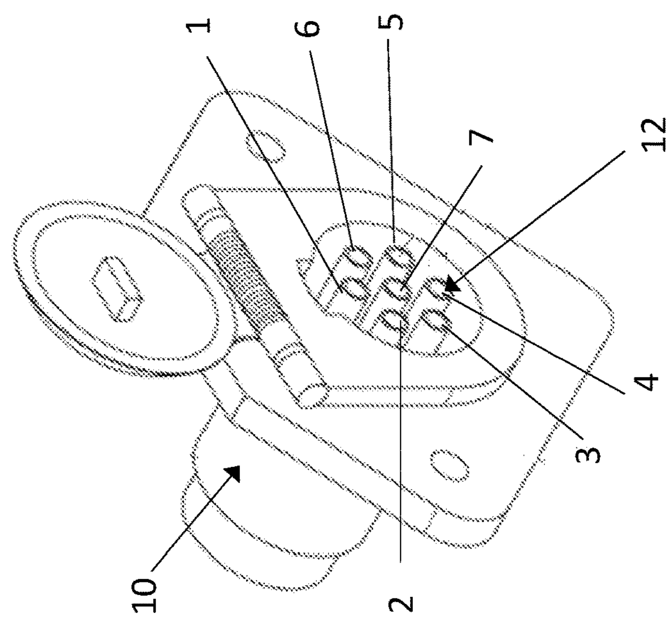

Tractor 22, trailers 24 and dollies 26 may include various fluid and electric lines that extend between tractor 22, trailers 24 and dollies 26. The fluid and electric lines allow delivery of fluids, electrical power, and communications between tractor 22 and trailers $\mathbf{24}_1$ . . . $\mathbf{24}_N$ for use in, for example, tire pressure management, braking and stability control, and control of lighting systems. In many conventional tractor-trailers, electric connections formed between two members of the tractor-trailer are configured for compliance with the SAE J560 Standard. In the illustrated embodiment tractor-trailer 20 may include an electric connection 28 between tractor 22 and trailer $\mathbf{24}_1$, an electrical connection 30 between trailer $\mathbf{24}_1$ and dolly 26, and an electrical connection 32 between dolly 26 and trailer 24, each of which is configured for compliance with the SAE J560 Standard. Accordingly, each member of tractor-trailer 20 may include one or more receptacles similar to the receptacle 10 shown in FIG. 1 that are coupled to conductors on that member extending between receptacles 10 on that member and to other electronic systems on that member. In one conventional embodiment, tractor 22 may include one receptacle 10 proximate the firewall or bulkhead separating the engine and passenger compartments of tractor 20 and another receptacle 10 on the exterior of the cab facing trailer $\mathbf{24}_1$. Each of trailers $\mathbf{24}_1$ . . . $\mathbf{24}_N$ may include receptacles 10 on or near the forward and rearward sides of the trailer 24. Dollies 26 may likewise include similar receptacles 10. It should be understood that the exact placement of receptacles 10 on each member of tractor-trailer 20 may vary and that the placements described herein are exemplary only. Receptacles 10 on different members of tractor-trailer 20 may be coupled using wire harnesses and plugs similar to the wire harness 14 and plug 16 shown in FIG. 1.

The electrical connections 28, 30, 32 between tractor 22, trailers $\mathbf{24}_1$ . . . $\mathbf{24}_N$, and dollies 26 of tractor-trailer 20 enables transfer of electrical power and communications (i.e., electric signals conveying data and commands) between various electronic systems 34, $\mathbf{36}_1$ . . . $\mathbf{36}_N$ on tractor 22 and trailers $\mathbf{24}_1$ . . . $\mathbf{24}_N$, respectively. Systems 34, 36 may comprise any of a wide variety of systems commonly employed on tractor-trailer 20 including, for example, anti-lock braking systems, collision avoidance systems, tire pressure monitoring and control systems, trailer load monitoring systems, and lighting systems. The electrical connections 28, 30, 32 may enable transmission of data from one or more systems 36 on trailers 24 to a system 34 on tractor 22 including, for example, sensor readings indicative of the operation of an anti-lock braking system, the location of surrounding vehicles and infrastructure, pressure within the tires on a trailer 24, or a shift in the load carried by a trailer 24. The electrical connections 28, 30, 32 may also enable transmission of commands and data from a system 34 on tractor 22 to systems 36 on trailers 24 for use in controlling elements of an anti-lock braking system, tire pressure control system or lighting system on one or more of trailers 24. In conventional tractor-trailers, communications containing data and/or commands may be transmitted along connections 28, 30, 32 between systems 34, 36 using power line communications and, in particular, the communications protocol developed by the Society of Automotive Engineers (SAE) and set forth in the publication "J2497 Power Line Carrier Communications for Commercial Vehicles."

The reliance on SAE J560 electrical connections such as connections 28, 30, 32 in tractor-trailers 20 has a number of limitations. In particular, because SAE J560 electrical connections employ only seven conductors and those conductors have predetermined functions, there is limited bandwidth in the connections. This makes it difficult to transmit communications between members of tractor-trailer 20 from the ever-growing number of electric systems 34, 36 on tractor-trailers 20—many of which rely on more robust on-board or intra-member communication networks for communication with electric systems 34, 36 on the same member and which use a variety of different communication protocols. Further, certain communications that are currently exchanged over SAE J560 electrical connections through power line communication use a direct current waveform as the carrier wave and these communications may fail in tractor-trailers having many members due to the number of connections and/or the physical length of the signal path.

Referring again to FIG. 2, a system 38 in accordance with the teachings disclosed herein for transmitting and receiving communications formed using a plurality of different communication protocols between members 22, 24, 26 of tractor-trailer 20 over SAE J560 electrical connections 28, 30, 32 between members 22, 24, 26 of tractor-trailer 20 may include a plurality of communication hubs 40. Each communication hub 40 may be mounted on a corresponding member 22, 24, 26 of tractor-trailer 20. In the illustrated embodiment, hub $\mathbf{40}_1$ is mounted on tractor 20, hub $\mathbf{40}_2$ is mounted on trailer $\mathbf{24}_1$, hub $\mathbf{40}_3$ is mounted on dolly 26 and hub $\mathbf{40}_4$ is mounted on trailer $\mathbf{24}_2$. In the illustrated embodiment, hubs $\mathbf{40}_1$, $\mathbf{40}_2$, $\mathbf{40}_3$, and $\mathbf{40}_4$ are mounted underneath tractor 22, trailer $\mathbf{24}_1$, dolly 26, and trailer $\mathbf{24}_2$, respectively, but it should be understood that the exact location of hubs $\mathbf{40}_1$, $\mathbf{40}_2$, $\mathbf{40}_3$, and $\mathbf{40}_4$ on tractor 22, trailer $\mathbf{24}_1$, dolly 26 and trailer $\mathbf{24}_2$ may vary. Each communication hub 40 may be configured for connection with one or more receptacles 10 on the corresponding member 22, $\mathbf{24}_1$, 26, $\mathbf{24}_2$, and with one or more electric systems 34, 36 on the corresponding member 22, $\mathbf{24}_1$, 26, $\mathbf{24}_2$. In alternative embodiments, hubs 40 may replace one of the receptacles 10 on a corresponding member 22, $\mathbf{24}_1$, 26, $\mathbf{24}_2$. For example, hub $\mathbf{40}_2$ on trailer $\mathbf{24}_1$ may be mounted at a forward end of trailer $\mathbf{24}_1$ in place of a receptacle 10 at the forward end of trailer $\mathbf{24}_1$ that connects trailer $\mathbf{24}_1$ with tractor 22 and be configured for connection with another receptacle 10 on the rearward end of trailer $\mathbf{24}_1$ and one ore more electric systems 36 on trailer $\mathbf{24}_1$.

Figure 3:
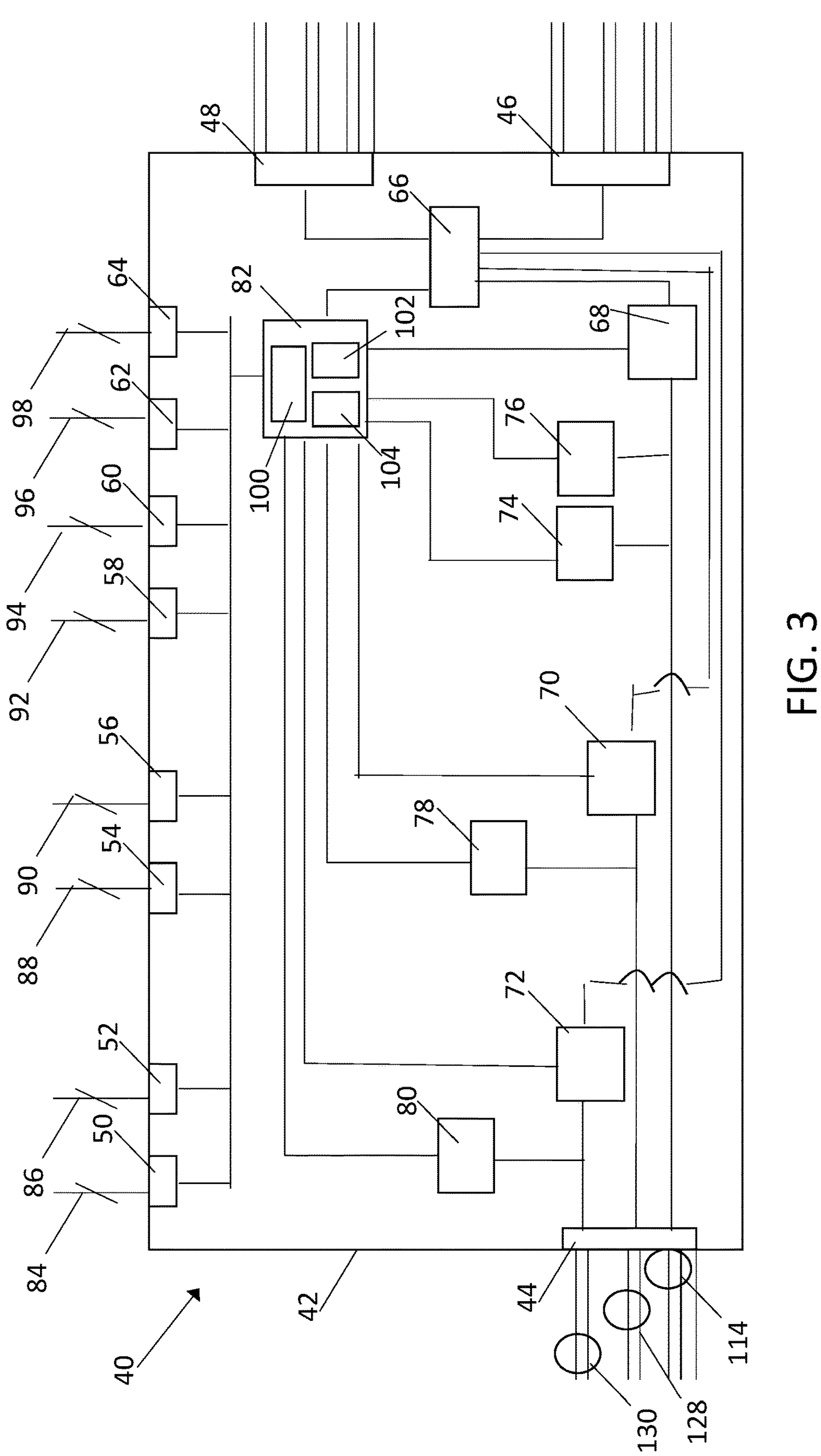
FIG. 3 is a diagrammatic view of one embodiment of a communications hub for use in the system of FIG. 2.

Referring now to FIG. 3, one embodiment of a communication hub 40 is shown. It should be understood that hubs $\mathbf{40}_1$, $\mathbf{40}_2$, $\mathbf{40}_3$, and $\mathbf{40}_4$ may be similar in structure and function. Alternatively, one more of hubs $\mathbf{40}_1$, $\mathbf{40}_2$, $\mathbf{40}_3$, and $\mathbf{40}_4$ may omit certain structure and functionality found on hub 38. For example, hub $\mathbf{40}_3$ on dolly 26 may act as a pass through for communications between trailers 24 and may therefore omit certain structure and functionality found in hubs $\mathbf{40}_1$. $\mathbf{40}_2$, and $\mathbf{40}_4$ that is intended for communication with electrical systems 34, 36 found on tractors 22 and trailers 24. Hub 40 may include a housing 42, a plurality of communication interfaces 44, 46, 48, 50, 52, 54, 56, 58, 60, 62, 64, one or more interface selector circuits 66 a plurality of power converters 68, 70, 72 a plurality of power line communication codecs 74, 76, 78, 80 and a controller 82.

Housing 42 is provided to position and orient the other components of communications hub 40 and to protect components within housing 42 from foreign objects and elements. Housing 42 may be made from conventional materials. The exact shape and configuration of housing 42 will vary depending on, among other factors, the number of communication interfaces and other components contained in housing 42 and the mounting location for housing 42 on the corresponding member of tractor-trailer 20.

Communication interfaces 44 and 46 are each configured for connection with one of electrical connections 28, 30, 32 between members of tractor-trailer 20. Communication interface 48 is configured for connection with one or more electrical systems 34, 36 on tractor 22 or a trailer 24 for use in providing conventional power, data and control signals in accordance with the SAE J560 Standard described hereinabove. Accordingly, each of communication interfaces 44, 46, 48 is configured for compliance with the SAE J560 Standard. One or more of interfaces 44, 46, 48 may be sealed against entry of foreign objects and elements.

Communication interfaces 50, 52, 54, 56, 58, 60, 62, 64 are provided to interface with different on-board or intra-member communication networks 84, 86, 88, 90, 92, 94, 96, 98 on the member of tractor-trailer on which hub 40 is mounted. The configuration of each interface 50, 52, 54, 56, 58, 60, 62, 64 will vary depending on the physical and functional requirements of the corresponding intra-member communications network 84, 86, 88, 90, 92, 94, 96, 98 including the communication protocol for the network. Communication interfaces 50, 52, 54, 56, 58, 60, 62, 64 may therefore be configured to transmit and receive communications using a variety of different communication protocols. Intra-member communication networks 84, 86, 88, 90, 92, 94, 96, 98 and protocols may, for example, include controller area networks (CAN) operating at a variety of different voltage levels including controller area networks in compliance with Society of Automotive Engineers (SAE) standard J1939 and International Organization for Standardization (ISO) standard 11992, standard ethernet networks in compliance with Institute for Electrical and Electronics Engineers (IEEE) standard 802.3 and capable of 10 Mbps, 100 Mbps and/or 1000 Mbps (i.e. 1000BASE-T) transmission speeds and automotive ethernet networks, power line communication networks in compliance with SAE standard J2497, and multi-gigabit serial link (MGSL) networks. One or more of interfaces 50, 52, 54, 56, 58, 60, 62, 64 may again be sealed against entry of foreign objects and elements. It should be understood that a member of tractor-trailer may have more than one of the same type of intra-member communication network 84, 86, 88, 90, 92, 94, 96, 98 using the same communication protocols and that hub 40 may therefore include multiple communication interfaces 50, 52, 54, 56, 58, 60, 62, 64 having the same or similar configuration.

Interface selector circuit 66 is provided to select a transmission path for communications that may be exchanged with either another member of tractor-trailer 20 through interface 46 or with electrical systems 34, 36 onboard the member through interface 48. Circuit 66 is conventional in the art and may comprise one or more relays or similar circuits. Circuit 66 may operate under the control of controller 82. It should also be understood that controller 82 may create signal paths commonly through equivalent pins in interfaces 44, 46, 48.

Power converters 68, 70, 72 are provided to convert power signals transmitted between the members of the tractor-trailer 20 over electrical connections 28, 30, 32 between a direct current waveform and an alternating current waveform. Power converters 68, 70, 72 are conventional in the art. In the illustrated embodiment, hub 40 includes three power converters 68, 70, 72 for reasons discussed hereinbelow. It should be understood, however, that the number of power converters 68, 70, 72 in hub 40 may vary and that a single power converter may be used in some circumstances. Power converters 68, 70, 72 may invert a direct current waveform to an alternating current waveform. Power converters 68, 70, 72 may also rectify an alternating current waveform to a direct current waveform. Power converters 68, 70, 72 are activated responsive to control signals generated by controller 82. In particular, when there is a need to exchange communications between one of communication interfaces 46, 48 and one of communication interfaces 50, 52, 54, 56, 58, 60, 62, 64 (e.g., to transmit a communication from one of intra-member communication networks 84, 86, 88, 90, 92, 94, 96, 98 to another member of tractor-trailer 20), controller 82 causes one or more of the power converters 68, 70, 72 to convert a direct current waveform of the power signal (normally provided by the vehicle battery) to an alternating current waveform. As described hereinbelow, that waveform may than be encoded or decoded by codecs 76, 78, 80 to allow the exchange of communications across one of electrical connections 28, 30, 32 through power line communication. In accordance with one aspect of the disclosed system, power converters 68, 70, 72 may comprise buck-boost power converters configured to increase or decrease, respectively, the voltage of the incoming electrical signal. For example, a power converter 68, 70, 72 in a hub 40 on one side of an electrical connection 28, 30, 32 may invert an incoming direct current waveform to an alternating current waveform having a voltage of 32 Volts and a power converter 68, 70, 72 in a hub 40 on the opposite side of the electrical connection 28, 30, 32 may rectify the incoming alternating current waveform to a direct current waveform having a voltage at or proximate to 14.2 Volts. In this manner, a system in accordance with the teachings herein is able to maintain a desired voltage level across multiple electrical connections within tractor-trailer 20.

Power line communication codecs 74, 76, 78, 80 are provided to encode power line communications onto the alternating current waveform generated by power converters 68, 70, 72 and output by hub 40 and to decode power line communications carried on alternating current waveforms input to hub 40 from another source. Codecs 74, 76, 78, 80 are conventional in the art and may comprise transceivers or separate transmitters and receiver pairs. In one embodiment, the codec may comprise the transceiver marketed by Maxim Integrated Products, Inc. under the name "MAX2982 Industrial Broadband Powerline Modem". In accordance with one aspect of the present teachings, hub 40 includes two types of codecs. Codec 74 is provided to encode and decode relatively low speed power line communications over the alternating current waveform during a synchronization mode of operation in which hub 40 establishes a communications network with another hub 40 on tractor-trailer 20 as described in greater detail below. Codecs 76, 78, 80 are provided to encode and decode relatively high-speed communications over the alternating current waveform during a messaging mode of operation after the communications network is established.

Controller 82 is provided to manage the flow of communications between interfaces 44, 46, 48, 50, 52, 54, 56, 58, 60, 62, 64. In particular, controller 82 provides traffic shaping (or packet shaping) functions to manage the available bandwidth in the electrical connection 28, 30, 32 and prioritize and control the flow of communications between interfaces 44, 46, 48, 50, 52, 54, 56, 58, 60, 62, 64. Controller 82 may also be configured to convert communications received from communication networks using non-power line communication protocols into power line communications through appropriate control of power converters 68, 70, 72 and codecs 76, 78, 80. In this regard, controller 82 may be configured in accordance with SAE publication "J2497 Power Line Carrier Communications for Commercial Vehicles.". Alternatively, an additional circuit external to controller 82 may be provided for this purpose. Controller 82 may comprise a programmable microprocessor or microcontroller or may comprise an application specific integrated circuit (ASIC). In accordance with the present teachings, controller 82 may be configured with appropriate programming instructions (i.e., software or a computer program) to implement several steps in a method for transmitting and receiving communications formed using a plurality of different communication protocols between first and second members of a tractor-trailer over an SAE J560 electrical connection as discussed in greater detail below. Controller 82 may include a memory 100 and a central processing unit (CPU) 102. Controller 82 may also include an input/output (I/O) interface 104 including a plurality of input/output pins or terminals through which controller 82 may receive a plurality of input signals and transmit a plurality of output signals. The input signals may include signals received from interfaces 44, 46, 48, 50, 52, 54, 56, 58, 60, 62, 64 and codecs 74, 76, 78, 80 the output signals may include signals transmitted to interfaces 44, 46, 48, 50, 52, 54, 56, 58, 60, 62, 64, interface selector circuits 66, power converters 68, 70, 72, and codecs 74, 76, 78, 80. In the illustrated embodiment, a single controller 82 is shown. It should be understood, however, that the functionality of controller 82 described herein may be divided among multiple sub-controllers.

Figure 4:
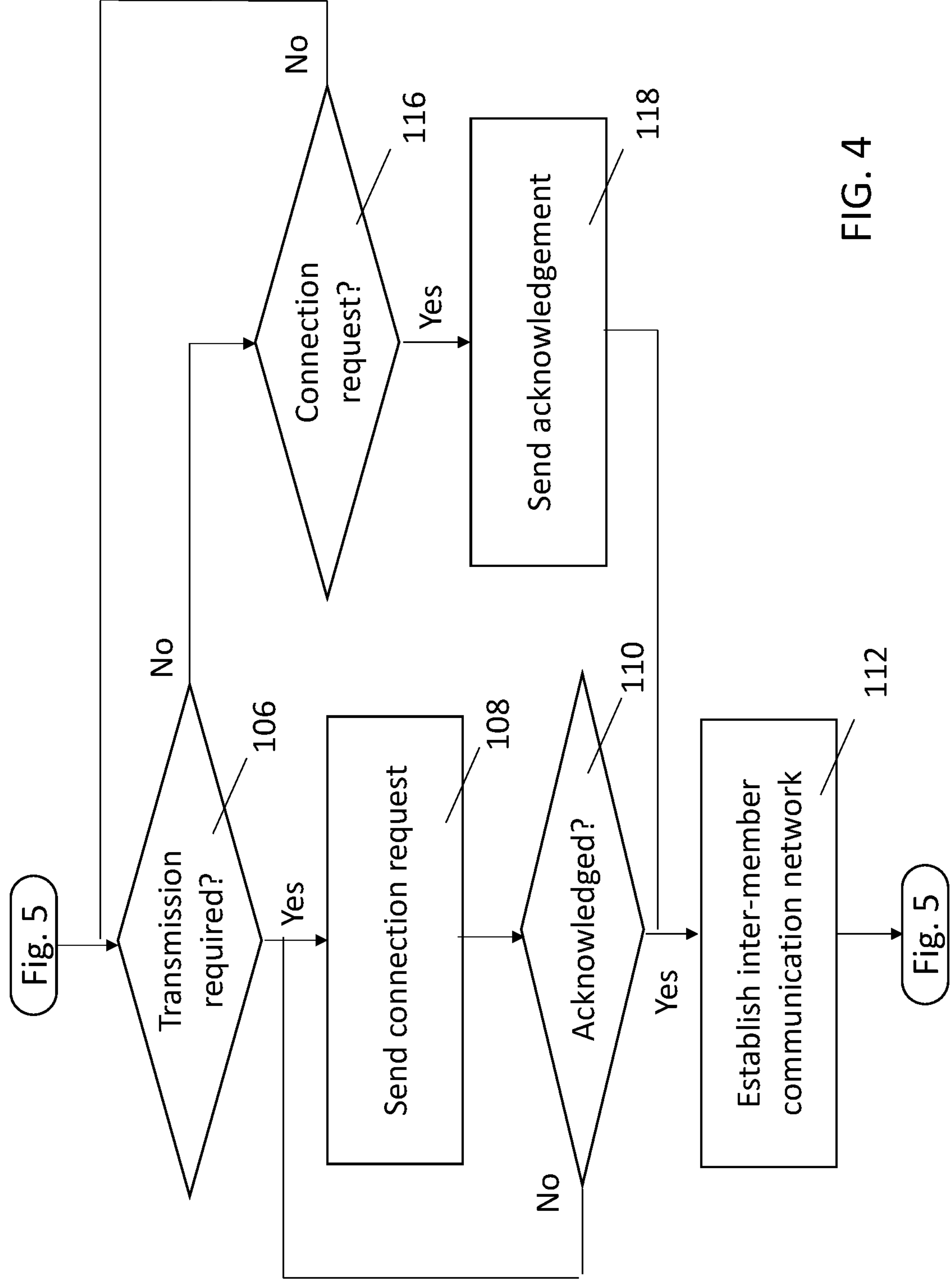
FIGS. 4-5 are flow chart diagrams illustrating embodiments of a method for transmitting and receiving communications formed using a plurality of different communication protocols between members of the tractor-trailer over a SAE J560 electrical connection.
Figure 5:
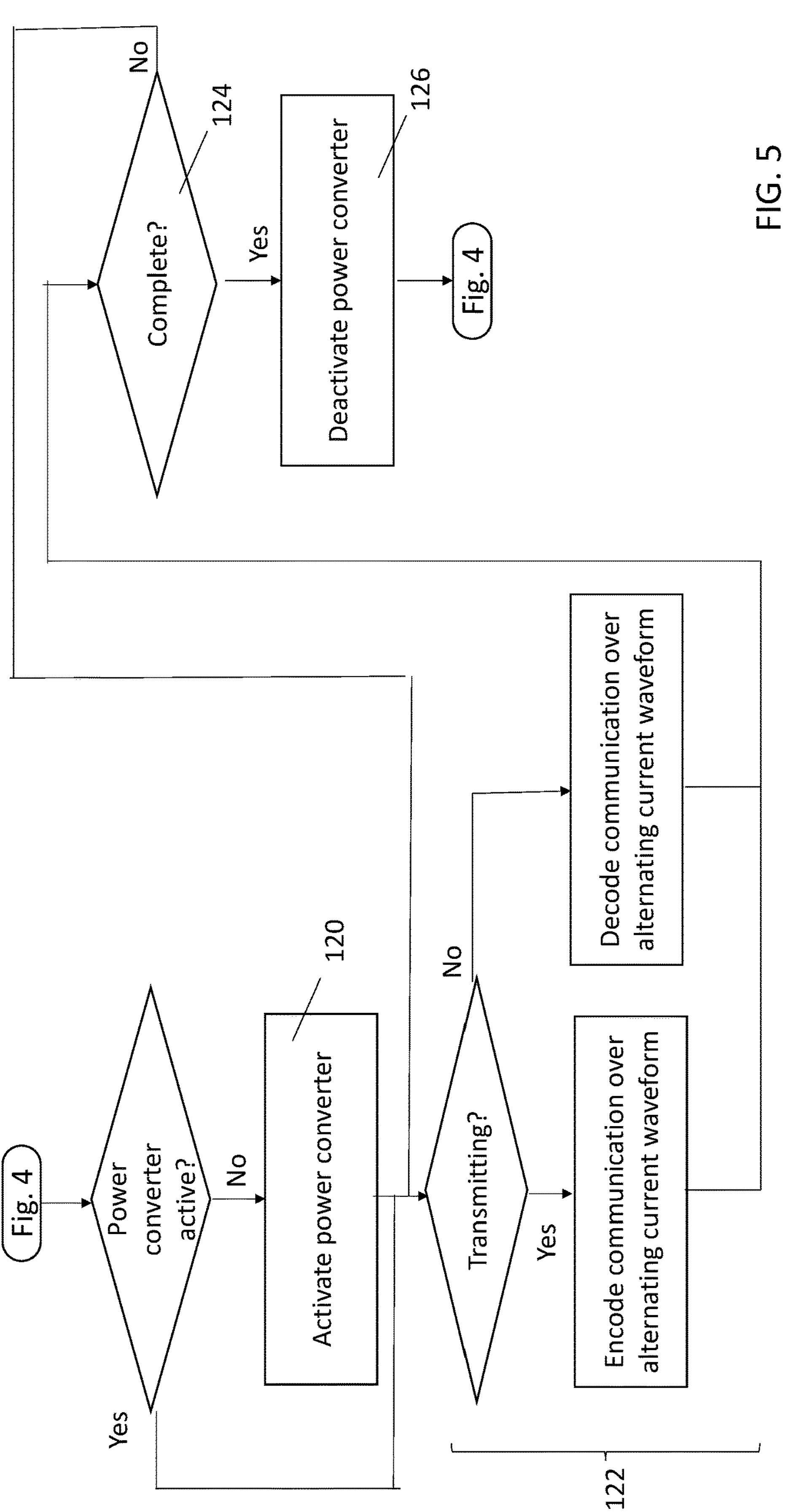

Referring now to FIGS. 4-5, one embodiment of a method for transmitting and receiving communications formed using a plurality of different communication protocols between members of a tractor-trailer over a SAE J560 electrical connection is illustrated. In performing the method, the system may engage in several different modes of operation. In one mode of operation (a "Synchronization Mode") a hub 40 determines whether the SAE J560 electrical connection 28, 30, 32 between two members of tractor-trailer 20 is needed for exchanging communications other than the standard SAE J560 communications typically transmitted across the electrical connection 28, 30, and, if so, the hub 40 establishes an inter-member communication network between two members of the tractor-trailer 20 using a pair of wires from the electrical connection 28, 30, 32. If the SAE J560 electrical connection 28, 30, 32 is not required for exchanging communications other than standard SAE J560 communications, controller 82 will not generate any control signals to power converters 68, 70, 72 or codecs 74, 76, 78, 80 and the communications will simply be passed through between interfaces 44, 46.

Referring to FIG. 4, the Synchronization Mode may begin with the step 106 in which controller 82 determines whether the electrical connection 28, 30, 32 is needed to transmit a communication between members of tractor-trailer 20 that is not a standard SAE J560 communication. These communications may originate on the member of tractor-trailer 20 on which hub 40 is mounted. For example, the communication may be generated by an electrical system 34, 36 on the member of tractor-trailer 20 on which hub 40 is mounted and be passed along an intra-member communication network 84, 86, 88, 90, 92, 94, 96, 98 to hub 40 through one of interfaces 50, 52, 54, 56, 58, 60, 62, 64 using any of a variety of different communication protocols. The communications may alternatively originate on a member of tractor-trailer 20 other than the member on which hub 40 is mounted and be received by the member of tractor-trailer 20 on which hub 40 is mounted over one electrical connection 28, 30, 32 for through transmission to another member of tractor-trailer 20 over another electrical connection 28, 30, 32.

If controller 82 determines in step 106 that message other than a standard SAE J560 communication requires transmission across the electrical connection 28, 30, 32, controller 82 may, in step 108, generate a connection request and transmit that request through the electrical connection 28, 30, 32. Referring to FIG. 3, in accordance with one aspect of the invention, controller 82 may transmit a control signal to codec 74 to encode a power line communication corresponding to the connection request over a direct current waveform being transmitted on a first pair of conductors of the electrical connection. In another embodiment, controller 82 may also transmit a control signal to power converter 68 to activate power converter 68 to convert the direct current waveform into an alternating current waveform and encode a power line communication corresponding to the connection request over the alternating current waveform. As discussed above, codec 74 is configured to encode and decode communications using a different communication protocol than codecs 76, 78, 80 and, in particular, may be configured to generate communications sent at lower speeds than those generated by codecs 76, 78, 80. Codec 74 may generate communications in a frequency band outside of that used for power line communications under the SAE J2497 standard.

After transmission of the connection request through the electrical connection 28, 30, 32, controller 82 may, in step 110, monitor the electric connection for an acknowledgement from the hub 40 on the opposite end of the electric connection 28, 30, 32. Step 110 may be performed for a predetermined period of time and, if no acknowledgement is received by hub 40, the method may return to step 108 and resend the connection request. Although not illustrated in FIG. 4, it should be understood that various conditions (e.g., a predetermined number of attempts) may be placed on the connection attempt to avoid an infinite loop and that the method may terminate once such conditions are met. If an acknowledgement of the connection request is received, the method may continue in step 112 with conventional actions required to synchronize further communications between the two hubs 40 and establish the inter-member communication network across electric connection 28, 30, 32. Referring to FIG. 3, the inter-member communication network 114 is established using two conductors of the electrical connection 28, 30, 32. In certain embodiments, controller 82 may be configured to continuously monitor the quality of the inter-member communication network 114 once established and to generate notifications regarding any decreased quality in the network to the vehicle operator to allow for potential maintenance of physical components forming the network. Controller 82 may also be configured to transmit a preconfigured message or packet on one more intra-member communication networks 84, 86, 88, 90, 92, 94, 96, 98 or another inter-member communication network to signal a loss of communication on a previously established inter-member communication network.

Referring again to FIG. 4, if controller 82 determines in step 106 that transmission of a message other than a standard SAE J560 communication is not required, controller 82 may, in step 116 monitor the electric connection 28, 30, 32 for a connection request from another hub 40. If no connection request is present, the method may return to step 106. If a connection request is present, controller 82 may generate an acknowledgement in step 118 and transmit the acknowledgement through the electrical connection 28, 30, 32 in a manner similar to transmission of the connection request described hereinabove. The method may then proceed to step 112 discussed above.

Referring now to FIG. 5, once hub 40 has established the inter-member communication network 114 between members of the tractor-trailer 20 over a pair of conductors in electrical connection 28, 30, 32, hub 40 may enter another operating mode ("Communication Mode") during which communications are exchanged between the two members of tractor-trailer 20 across the inter-member communication network 114. The Communication Mode may begin with the step 120 in which controller 82 generates a control signal to activate power converter 68 (if not already activated during the Synchronization Mode). Upon activation, power converter 68 will invert a direct current waveform input to the power converter 68 from an external power source into an alternating current waveform for transmission across the electrical connection 28, 30, 32 over network 114. Power converter 68 will also rectify an alternating current waveform received across the electrical connection 28, 30, 32 over network 114.

Once the power converter 68 is activated, the method may continue with the step 122 in which controller 82 generates a control signal to codec 76. If hub 40 is transmitting a communication to another hub 40 across the electrical connection 28, 30, 32 over network 114, codec 76 will encode a communication over the alternating current waveform output by power converter 68 to form a power line communication signal including a set of information for delivery to another member of tractor-trailer 20 across the electrical connection 28, 30, 32 over network 114. If hub 40 is receiving a communication from another hub 40 across the electrical connection 28, 30, 32 over network 114, codec 76 will decode a communication over the alternating current waveform received across the connection 28, 30, 32 over network 114 to obtain a set of information for delivery to an electrical system 34, 36 on the member of tractor-trailer 20 on which hub 40 is mounted or for further transmission to yet another member of tractor-trailer 20.

Once the communication has been encoded and sent across the connection 28, 30, 32 over network 114 or received across the connection 28, 30, 32 over network 114 and decoded, the method may continue with the step 124 of determining whether use of the inter-member communication network 114 is still required. Controller 82 may make this determination based on a variety of conditions including, for example, the absence of further communications requiring transmission from the member of tractor-trailer 20 on which the hub 40 is mounted and/or the absence of further communications received from hubs 40 on other members of tractor-trailer 20, predetermined time limits, or requests for use of the electrical connection for other purposes including standard SAE J560 communications. If controller 82 determines in step 124 that use of the inter-member communication network 114 should be ended, controller 82 may generate a control signal to power converter 68 to deactivate power converter 68 and the network 114 and return to the Synchronization Mode illustrated in FIG. 4.

Referring again to FIG. 3, the discussion above focused on establishment of one inter-member communication network 114 across the electrical connection 28, 30, 32 using two of the seven conductors. The communications hub 40 may, however, be further configured to establish a plurality of inter-member communication networks across the electrical connection 28, 30, 32. In the embodiment illustrated in FIG. 3, hub 40 may be further be configured to establish inter-member communication networks 128, 130 across the electrical connection 28, 30, 32 in a similar manner to network 114 using power converters 70, 72, additional codecs similar to codec 74 (not shown) and codecs 78, 80, respectively, and using distinct pairs of conductors in the electrical connection 28, 30, 32. In yet another embodiment, hub 40 may be configured to establish even more inter-member communication networks by employing additional power converters and codecs and using a common conductor for a ground return. In this manner, hub 40 may be configured to establish as many as six different inter-member communication networks across a single SAE J560 electrical connection 28, 30, 32 using the common ground return and a different one of the other six conductors in the electrical connection 28, 30, 32 for each inter-member communication network.

As noted above, controller 82 controls may provide traffic shaping (or packet shaping) functions to manage the available bandwidth in the electrical connection 28, 30, 32 and prioritize and control the flow of communications between interfaces 44, 46, 48, 50, 52, 54, 56, 58, 60, 62, 64. As part of this process, controller 82 may map or route communications exchanged between individual intra-member communication networks 84, 86, 88, 90, 92, 94, 96, 98 through communication interfaces 50, 52, 54, 56, 58, 60, 62, 64 to specific inter-member communication networks 114, 128, 130. For example, communications transmitted to or received from intra-member communication networks 84, 86 through communication interfaces 50, 52 may be transmitted over inter-member communications network 130, communications transmitted to or received from intra-member communication networks 88, 90 through communication interfaces 54, 56 may be transmitted over inter-member communications network 128, while communications transmitted to or received from intra-member communications networks 92, 94, 96, 98 through communication interfaces 58, 60, 62 64 may be transmitted over inter-member communications network 114. It should be understood that the mapping of communications from a particular intra-member communication network 84, 86, 88, 90, 92, 94, 96, 98 to a particular inter-member communication network 114, 128, 130 may be varied. For example, communications may be mapped from a single intra-member communication network 84, 86, 88, 90, 92, 94, 96, 98 or multiple intra-member communication networks 84, 86, 88, 90, 92, 94, 96, 98 to a single inter-member communications network 114, 128, 130. Further, controller 82 may adjust the mapping of intra-member communications networks 84, 86, 88, 90, 92, 94, 96, 98 to inter-member communications networks 114, 128, 130 based on a variety of conditions associated with the operation of tractor-trailer 20 such as the operational state of one more components on tractor-trailer 20, a sensed operating condition of tractor-trailer 20 (e.g., whether the tractor-trailer is braking, suffering from a loss of stability, etc.) a sensed condition relating to the environment in which tractor-trailer 20 is operating (e.g., an increase in temperature or humidity or the presence of another vehicle or road infrastructure, etc.) a sensed condition relating to a behavior of the operator of tractor-trailer 20 (e.g., use of safety features by the operator, changes in position of the operator within tractor-trailer 20 or evidence of operator fatigue or distraction) or based on traffic loads on one or more intra-member communications network 84, 86, 88, 90, 92, 94, 96, 98 or inter-member communication networks 114, 128, 130. Controller 82 may adjust the mapping immediately in response to such conditions or over time based on a machine learning algorithm in controller 82. When multiple intra-member communication networks 84, 86, 88, 90, 92, 94, 96, 98 are mapped to a single inter-member communication network 114, 128, 130, controller 82 may be further configured to prioritize or order communications among those being sent to or from different intra-member communication networks 84, 86, 88, 90, 92, 94, 96, 98 for transmission and/or reception along the inter-member communication network 114, 128, 130 based on a variety of conditions associated with the operation of tractor-trailer 20 such as the operational state of one more components on tractor-trailer 20, a sensed operating condition of tractor-trailer 20 (e.g., whether the tractor-trailer is braking, suffering from a loss of stability, etc.) a sensed condition relating to the environment in which tractor-trailer 20 is operating (e.g., an increase in temperature or humidity or the presence of another vehicle or road infrastructure, etc.) or a sensed condition relating to a behavior of the operator of tractor-trailer 20 (e.g., use of safety features by the operator, changes in position of the operator within tractor-trailer 20 or evidence of operator fatigue or distraction). Controller 82 may also be configured with knowledge of message/packet timing requirements to ensure that messages/packets are delivered across electric connections 28, 30, 32 through networks 114, 128, 130 to other communication hubs 40 within those timing requirements.

Figure 6:
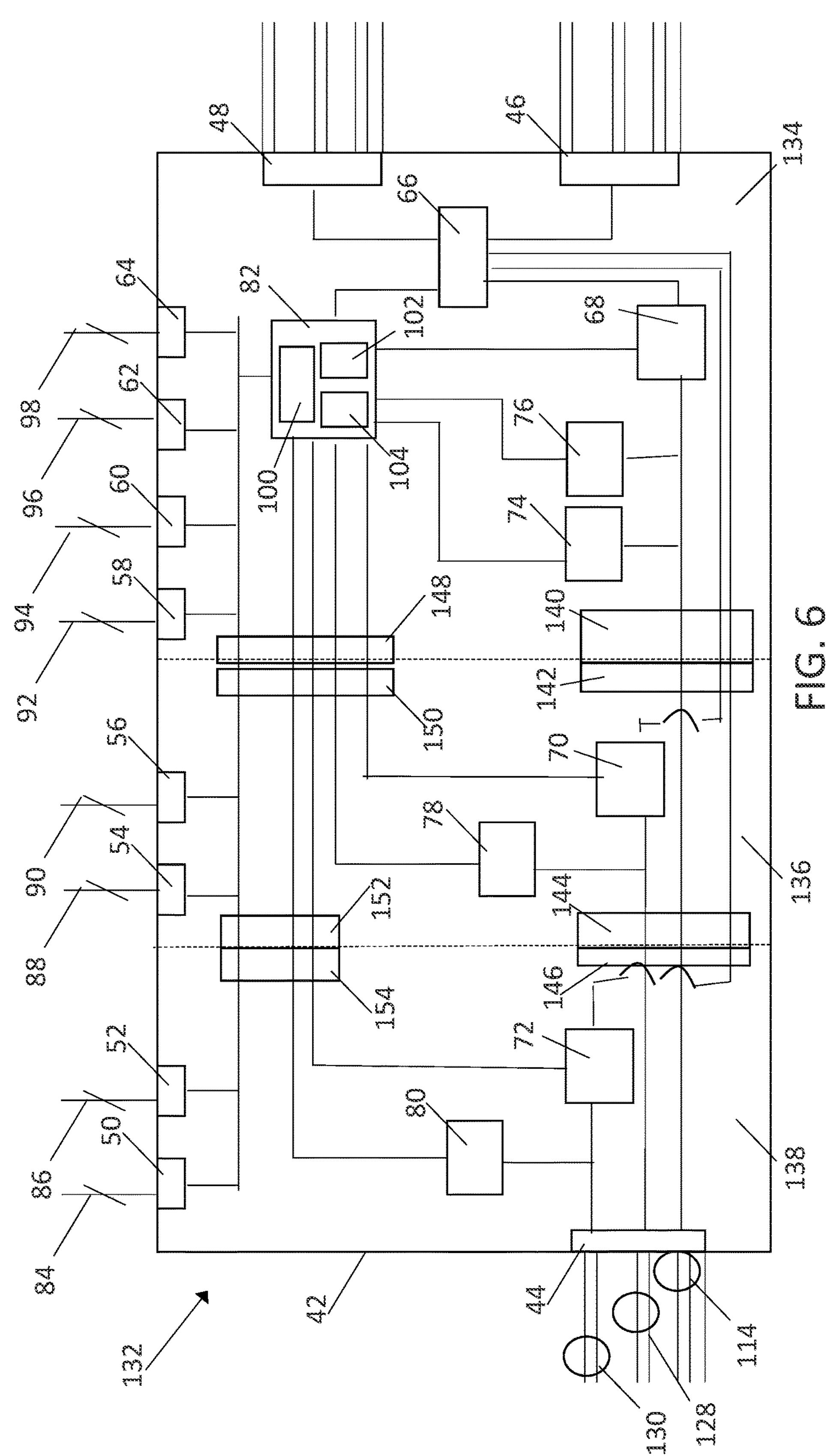
FIG. 6 is a diagrammatic view of another embodiment of a communications hub for use in the system of FIG. 2.

In the embodiment illustrated in FIG. 3, all of the components from hub 40 are disposed within a single housing 42. Referring now to FIG. 6, in an alternative embodiment, a communications hub 132 may be divided into separate modules 134, 136, 138—each of which is configured to establish one more inter-member communication networks 114, 128, 130 across the electrical connection 28, 30, 32 and to map one or more intra-member communications network 84, 86, 88, 90, 92, 94, 96, 98 to the inter-member communication network(s) 114, 128, 130. Each module 134, 136, 138 will include one or more communication interfaces 50, 52, 54, 56, 58, 60, 62, 64 configured to for connection to an intra-member communications network 84, 86, 88, 90, 92, 94, 96, 98, and interfaces 44, 46, 140, 142, 144, 146 in compliance with the SAE J560 Standard and configured for connection to either an electric connection 28, 30, 32 between members of tractor-trailer 20 (interfaces 44, 46) or to another SAE J560 Standard communications interface (interfaces 140, 142, 144, 146). In embodiments where hub 132 includes a single controller 82, each module may 134, 136, 138 further include one ore communication interfaces 148, 150, 152, 154 intended to allow for the transmission of signals between controller 82 in module 134 and the power converters 70, 72 and codecs 78, 80 in modules 136, 138. It should be understood, however, that in an alternative embodiment, each module 134, 136, 138 may include its own controller 82. Further, each module may include additional SAE J560 interfaces similar to interface 48 allowing communication the exchange of SAE J560 communications on the member on which hub 132 is mounted.

A system 38 and method for transmitting and receiving communications formed using different communication protocols between members of a tractor-trailer 20 in accordance the present teachings represent an improvement as compared to conventional systems and methods. In particular, the system 38 and method disclosed herein enable use of the existing SAE J560 electrical connection 28, 30, 32 between members of a tractor-trailer 20 to establish a plurality of different inter-member communication networks 114, 128, 130 and allow transfer of communications between members of the tractor-trailer 20 generated under a variety of different communication protocols. As a result, communications may be exchanged without replacement of, or additions to, the SAE J560 electrical connection 28, 30, 32 avoiding significant cost and vehicle downtime and also retaining the benefits of a rugged form of electrical connection 28, 30, 32 that is less prone to failure than other types of electrical connections and that can withstand a greater number of physical connection and disconnection cycles than other electrical connections. In addition, the system 38 and method are able to better maintain desired voltage levels across the SAE J560 electrical connection 28, 30, 32 and to prevent or avoid drops in that voltage that are compounded across multiple electrical connections. Further still, the system 38 and method improve the reliability of conventional power line communications transmitted across the SAE J560 electrical connection 28, 30, 32 by encoding the communications on an alternating current waveform.

While the invention has been shown and described with reference to one or more particular embodiments thereof, it will be understood by those of skill in the art that various changes and modifications can be made without departing from the spirit and scope of the invention.

What is claimed is:

1. A communications hub for transmitting and receiving communications formed using a plurality of different communication protocols between first and second members of a tractor-trailer over an electrical connection between the first and second members of the tractor-trailer, the electrical connection configured to comply with electrical requirements of the SAE J560 standard as it exists on the filing date of this application, comprising:

a first housing configured for mounting on the first member of the tractor-trailer;

a first communication interface supported on the first housing and configured for connection with the electrical connection between the first and second members of the tractor-trailer;

a second communication interface supported on the first housing and configured to transmit and receive communications over a first intra-member communication network on the first member of the tractor-trailer in accordance with a first communication protocol;

a first power converter supported within the first housing;

a first power line communication codec supported within the first housing; and, a first controller supported within the first housing and configured to establish a first inter-member communication network between the first and second members of the tractor-trailer over first and second conductors of the electrical connection;

control the first power converter to convert a first power signal transmitted between the first and second members of the tractor-trailer over the first inter-member communication network between a first direct current waveform and a first alternating current waveform; and, control the first power line communication codec to encode and decode communications over the first alternating current waveform and exchange communications between the second communication interface and the second member of the tractor-trailer over the first inter-member communication network further comprising a third communication interface supported on the first housing and configured to transmit and receive communications over a second intra-member communication network on the first member of the tractor-trailer in accordance with a second communication protocol different from the first communication protocol and wherein the first controller is further configured to control the first power line communication codec to encode and decode communications over the first alternating current waveform and exchange communications between the third communication interface and the second member of the tractor-trailer over the first inter-member communication network wherein the first controller is configured to order the communications between the second communication interface and the second member of the tractor-trailer and the communications between the third communication interface and the second member of the tractor-trailer in accordance with a condition relating to operation of the tractor-trailer.

2. A communications hub for transmitting and receiving communications formed using a plurality of different communication protocols between first and second members of a tractor-trailer over an electrical connection between the first and second members of the tractor-trailer, the electrical connection configured to comply with electrical requirements of the SAE J560 standard as it exists on the filing date of this application, comprising:

a first housing configured for mounting on the first member of the tractor-trailer;

a first communication interface supported on the first housing and configured for connection with the electrical connection between the first and second members of the tractor-trailer;

a second communication interface supported on the first housing and configured to transmit and receive communications over a first intra-member communication network on the first member of the tractor-trailer in accordance with a first communication protocol;

a first power converter supported within the first housing;

a first power line communication codec supported within the first housing; and, a first controller supported within the first housing and configured to establish a first inter-member communication network between the first and second members of the tractor-trailer over first and second conductors of the electrical connection;

control the first power converter to convert a first power signal transmitted between the first and second members of the tractor-trailer over the first inter-member communication network between a first direct current waveform and a first alternating current waveform; and, control the first power line communication codec to encode and decode communications over the first alternating current waveform and exchange communications between the second communication interface and the second member of the tractor-trailer over the first inter-member communication network further comprising a third communication interface supported on the housing and configured to transmit and receive communications over a second intra-member communication network on the first member of the tractor-trailer in accordance with a second communication protocol different from the first communication protocol;

a second power converter supported within the first housing; and a second power line communication codec supported within the first housing;

wherein the first controller is further configured to:

establish a second inter-member communication network between the first and second members of the tractor-trailer over a third conductor and one of the second conductor and a fourth conductor of the electrical connection;

control the second power converter to convert a second power signal transmitted between the first and second members of the tractor-trailer over the second inter-member communication network between a second direct current waveform and a second alternating current waveform; and, control the second power line communication codec to encode and decode communications over the second alternating current waveform and exchange communications between the third communication interface and the second member of the tractor-trailer over the second inter-member communication network.

3. The communications hub of claim 2 wherein the first controller is configured to order the communications between the second communication interface and the second member of the tractor-trailer and the communications between the third communication interface and the second member of the tractor-trailer in accordance with a condition relating to operation of the tractor-trailer.

4. The communications hub of claim 2 wherein the first controller is configured to simultaneously transmit one of the communications between the second communication interface and the second member of the tractor-trailer over the first inter-member communication network and one of the communications between the third communication interface and the second member of the tractor-trailer over the second inter-member communication network.

5. A communications hub for transmitting and receiving communications formed using a plurality of different communication protocols between first and second members of a tractor-trailer over an electrical connection between the first and second members of the tractor-trailer, the electrical connection configured to comply with electrical requirements of the SAE J560 standard as it exists on the filing date of this application, comprising:

a first housing configured for mounting on the first member of the tractor-trailer;

a first communication interface supported on the first housing and configured for connection with the electrical connection between the first and second members of the tractor-trailer;

a second communication interface supported on the first housing and configured to transmit and receive communications over a first intra-member communication network on the first member of the tractor-trailer in accordance with a first communication protocol;

a first power converter supported within the first housing;

a first power line communication codec supported within the first housing; and, a first controller supported within the first housing and configured to establish a first inter-member communication network between the first and second members of the tractor-trailer over first and second conductors of the electrical connection;

control the first power converter to convert a first power signal transmitted between the first and second members of the tractor-trailer over the first inter-member communication network between a first direct current waveform and a first alternating current waveform; and, control the first power line communication codec to encode and decode communications over the first alternating current waveform and exchange communications between the second communication interface and the second member of the tractor-trailer over the first inter-member communication network wherein the first controller only establishes the first inter-member communication network when the first controller either receives a first connection request from the second member of the tractor-trailer over the electrical connection or receives a connection acknowledgment from the second member of the tractor-trailer over the electrical connection in response to a second connection request generated by the first controller wherein at least one of the first connection request, the second connection request and the connection acknowledgment is transmitted over the electrical connection using a different communication protocol than the communications between the second communication interface and the second member of the tractor-trailer over the first inter-member communication network.

6. A communications hub for transmitting and receiving communications formed using a plurality of different communication protocols between first and second members of a tractor-trailer over an electrical connection between the first and second members of the tractor-trailer, the electrical connection configured to comply with electrical requirements of the SAE J560 standard as it exists on the filing date of this application, comprising:

a first housing configured for mounting on the first member of the tractor-trailer;

a first communication interface supported on the first housing and configured for connection with the electrical connection between the first and second members of the tractor-trailer;

a second communication interface supported on the first housing and configured to transmit and receive communications over a first intra-member communication network on the first member of the tractor-trailer in accordance with a first communication protocol;

a first power converter supported within the first housing;

a first power line communication codec supported within the first housing; and, a first controller supported within the first housing and configured to establish a first inter-member communication network between the first and second members of the tractor-trailer over first and second conductors of the electrical connection;

control the first power converter to convert a first power signal transmitted between the first and second members of the tractor-trailer over the first inter-member communication network between a first direct current waveform and a first alternating current waveform; and, control the first power line communication codec to encode and decode communications over the first alternating current waveform and exchange communications between the second communication interface and the second member of the tractor-trailer over the first inter-member communication network wherein the first controller only establishes the first inter-member communication network when the first controller either receives a first connection request from the second member of the tractor-trailer over the electrical connection or receives a connection acknowledgment from the second member of the tractor-trailer over the electrical connection in response to a second connection request generated by the first controller further comprising a second power line communication codec supported within the first housing and wherein the first controller is further configured to control the second power line communication codec to encode and decode communications over the first alternating current waveform to exchange the first connection request, second connection request, and connection acknowledgement over the electrical connection.

7. A communications hub for transmitting and receiving communications formed using a plurality of different communication protocols between first and second members of a tractor-trailer over an electrical connection between the first and second members of the tractor-trailer, the electrical connection configured to comply with electrical requirements of the SAE J560 standard as it exists on the filing date of this application, comprising:

a first housing configured for mounting on the first member of the tractor-trailer;

a first communication interface supported on the first housing and configured for connection with the electrical connection between the first and second members of the tractor-trailer;

a second communication interface supported on the first housing and configured to transmit and receive communications over a first intra-member communication network on the first member of the tractor-trailer in accordance with a first communication protocol;

a first power converter supported within the first housing;

a first power line communication codec supported within the first housing; and, a first controller supported within the first housing and configured to establish a first inter-member communication network between the first and second members of the tractor-trailer over first and second conductors of the electrical connection;

control the first power converter to convert a first power signal transmitted between the first and second members of the tractor-trailer over the first inter-member communication network between a first direct current waveform and a first alternating current waveform; and, control the first power line communication codec to encode and decode communications over the first alternating current waveform and exchange communications between the second communication interface and the second member of the tractor-trailer over the first inter-member communication network further comprising a second housing configured for mounting on the first member of the tractor-trailer;

a third communication interface supported on the second housing and configured for connection with the electrical connection between the first and second members of the tractor-trailer;

a fourth communication interface supported on the second housing and configured to transmit and receive communications over a second intra-member communication network on the first member of the tractor-trailer in accordance with one of the first communication protocol and a second communication protocol;

a fifth communication interface supported on the second housing and configured for communication with the first communication interface and the third communication interface;

a second power converter supported within the second housing;

a second power line communication codec supported within the second housing; and, a second controller supported within the second housing and configured to establish a second inter-member communication network between the first and second members of the tractor-trailer over a third conductor of the electrical connection and one of the second conductor and a fourth conductor of the electrical connection;

control the second power converter to convert a second power signal transmitted between the first and second members of the tractor-trailer over the second inter-member communication network between a second direct current waveform and a second alternating current waveform; and, control the second power line communication codec to encode and decode communications over the second alternating current waveform and exchange communications between the fourth communication interface and the second member of the tractor-trailer over the second inter-member communication network.

8. A communications hub for transmitting and receiving communications formed using a plurality of different communication protocols between first and second members of a tractor-trailer over an electrical connection between the first and second members of the tractor-trailer, the electrical connection configured to comply with electrical requirements of the SAE J560 standard as it exists on the filing date of this application, comprising:

a first housing configured for mounting on the first member of the tractor-trailer;

a first communication interface supported on the first housing and configured for connection with the electrical connection between the first and second members of the tractor-trailer;

a second communication interface supported on the first housing and configured to transmit and receive communications over a first intra-member communication network on the first member of the tractor-trailer in accordance with a first communication protocol;

a first power converter supported within the first housing;

a first power line communication codec supported within the first housing; and, a first controller supported within the first housing and configured to establish a first inter-member communication network between the first and second members of the tractor-trailer over first and second conductors of the electrical connection;

control the first power converter to convert a first power signal transmitted between the first and second members of the tractor-trailer over the first inter-member communication network between a first direct current waveform and a first alternating current waveform; and, control the first power line communication codec to encode and decode communications over the first alternating current waveform and exchange communications between the second communication interface and the second member of the tractor-trailer over the first inter-member communication network further comprising a second housing configured for mounting on the first member of the tractor-trailer;

a third communication interface supported on the second housing and configured for connection with the electrical connection between the first and second members of the tractor-trailer;

a fourth communication interface supported on the second housing and configured to transmit and receive communications over a second intra-member communication network on the first member of the tractor-trailer in accordance with one of the first communication protocol and a second communication protocol;

a fifth communication interface supported on the second housing and configured for communication with the first communication interface and the third communication interface;

a second power converter supported within the second housing; and, a second power line communication codec supported within the second housing wherein the first controller is further configured to establish a second inter-member communication network between the first and second members of the tractor-trailer over a third conductor of the electrical connection and one of the second conductor and a fourth conductor of the electrical connection;

control the second power converter to convert a second power signal transmitted between the first and second members of the tractor-trailer over the second inter-member communication network between a second direct current waveform and a second alternating current waveform; and, control the second power line communication codec to encode and decode communications over the second alternating current waveform and exchange communications between the fourth communication interface and the second member of the tractor-trailer over the second inter-member communication network.

9. A communications hub for transmitting and receiving communications formed using a plurality of different communication protocols between first and second members of a tractor-trailer over an electrical connection between the first and second members of the tractor-trailer, the electrical connection configured for compliance with standard SAE J506 as it exists on the filing date of this application, comprising:

a housing configured for mounting on the first member of the tractor-trailer;

a first communication interface supported on the housing and configured for connection with the electrical connection between the first and second members of the tractor-trailer;

a second communication interface supported on the housing and configured to transmit and receive communications over a first intra-member communication network on the first member of the tractor-trailer in accordance with a first communication protocol;

a plurality of power converters supported within the housing;

a plurality of power line communication codecs supported within the housing; and, a controller supported within the housing and configured to establish a plurality of inter-member communication networks between the first and second members of the tractor-trailer, each of the plurality of inter-member communication networks formed over different pairs of conductors of the electrical connection;

control each of the plurality of power converters to convert a corresponding power signal transmitted between the first and second members of the tractor-trailer over a corresponding one of the plurality of inter-member communication networks between a direct current waveform and an alternating current waveform; and, control each of the plurality of power line communication codecs to encode and decode communications over a corresponding alternating current waveform and exchange communications between the second communication interface and the second member of the tractor-trailer over a first inter-member communications network of the plurality of inter-member communication networks.

10. The communications hub of claim 9, further comprising a third communication interface supported on the housing and configured to transmit and receive communications over a second intra-member communication network on the first member of the tractor-trailer in accordance with a second communication protocol different from the first communication protocol and wherein the controller is further configured, in controlling each of the plurality of power line communication codecs to encode and decode communications over a corresponding alternating current waveform, to exchange communications between the third communication interface and the second member of the tractor-trailer over the first inter-member communication network.

11. The communications hub of claim 10 wherein the controller is configured to order the communications between the second communication interface and the second member of the tractor-trailer and the communications between the third communication interface and the second member of the tractor-trailer in accordance with a condition relating to operation of the tractor-trailer.

12. The communications hub of claim 9, further comprising a third communication interface supported on the housing and configured to transmit and receive communications over a second intra-member communication network on the first member of the tractor-trailer in accordance with a second communication protocol different from the first communication protocol and wherein the controller is further configured, in controlling each of the plurality of power line communication codecs to encode and decode communications over a corresponding alternating current waveform, to exchange communications between the third communication interface and the second member of the tractor-trailer over a second inter-member communication network of the plurality of inter-member communication networks.

13. The communications hub of claim 12 wherein the controller is configured to order the communications between the second communication interface and the second member of the tractor-trailer and the communications between the third communication interface and the second member of the tractor-trailer in accordance with a condition relating to operation of the tractor-trailer.

14. The communications hub of claim 12 wherein the controller is configured to simultaneously transmit one of the communications between the second communication interface and the second member of the tractor-trailer over the first inter-member communication network and one of the communications between the third communication interface and the second member of the tractor-trailer over the second inter-member communication network.

15. The communications hub of claim 9 wherein the controller only establishes one of the plurality of inter-member communication networks when the controller either receives a first connection request from the second member of the tractor-trailer over the electrical connection or receives a connection acknowledgment from the second member of the tractor-trailer over the electrical connection in response to a second connection request generated by the controller.

16. The communications hub of claim 15 wherein at least one of the first connection request, the second connection request and the connection acknowledgment is transmitted over the electrical connection using a different communication protocol than the communications between the second communication interface and the second member of the tractor-trailer over the first inter-member communication network.

17. The communications hub of claim 15 wherein the first controller is further configured to control one of the plurality of power line communication codecs to encode and decode communications over a corresponding alternating current waveform to exchange the first connection request, second connection request, and connection acknowledgement over the electrical connection.

18. A communications hub for transmitting and receiving communications formed using a plurality of different communication protocols between first and second members of a tractor-trailer over an electrical connection between the first and second members of the tractor-trailer, the electrical connection configured to comply with electrical requirements of the SAE J560 standard as it exists on the filing date of this application, comprising:

a first housing configured for mounting on the first member of the tractor-trailer;

a first communication interface supported on the first housing and configured for connection with the electrical connection between the first and second members of the tractor-trailer;

a second communication interface supported on the first housing and configured to transmit and receive communications over a first intra-member communication network on the first member of the tractor-trailer in accordance with a first communication protocol;

a first power converter supported within the first housing;

a first power line communication codec supported within the first housing; and, first control means, supported within the first housing, for establishing a first inter-member communication network between the first and second members of the tractor-trailer over first and second conductors of the electrical connection;

controlling the first power converter to convert a first power signal transmitted between the first and second members of the tractor-trailer over the first inter-member communication network between a first direct current waveform and a first alternating current waveform; and, controlling the first power line communication codec to encode and decode communications over the first alternating current waveform and exchange communications between the second communication interface and the second member of the tractor-trailer over the first inter-member communication network further comprising a third communication interface supported on the first housing and configured to transmit and receive communications over a second intra-member communication network on the first member of the tractor-trailer in accordance with a second communication protocol different from the first communication protocol wherein the first control means is further configured for controlling the first power line communication codec to encode and decode communications over the first alternating current waveform and exchange communications between the third communication interface and the second member of the tractor-trailer over the first inter-member communication network a second power converter supported within the first housing; and a second power line communication codec supported within the first housing;

wherein the first control means is further configured for establishing a second inter-member communication network between the first and second members of the tractor-trailer over a third conductor and one of the second conductor and a fourth conductor of the electrical connection;

controlling the second power converter to convert a second power signal transmitted between the first and second members of the tractor-trailer over the second inter-member communication network between a second direct current waveform and a second alternating current waveform; and, controlling the second power line communication codec to encode and decode communications over the second alternating current waveform and exchange communications between the third communication interface and the second member of the tractor-trailer over the second inter-member communication network.

19. The communications hub of claim 18, further comprising:

a second housing configured for mounting on the first member of the tractor-trailer;

a fourth communication interface supported on the second housing and configured for connection with the electrical connection between the first and second members of the tractor-trailer;

a fifth communication interface supported on the second housing and configured to transmit and receive communications over a third intra-member communication network on the first member of the tractor-trailer in accordance with one of the first communication protocol, the second communication protocol and a third communication protocol;

a sixth communication interface supported on the second housing and configured for communication with the first communication interface and the fourth communication interface;

a third power converter supported within the second housing;

a third power line communication codec supported within the second housing; and, second control means, supported in the second housing, for establishing the second inter-member communication network between the first and second members of the tractor-trailer over the third conductor of the electrical connection and the one of the second conductor and the fourth conductor of the electrical connection;

controlling the third power converter to convert a third power signal transmitted between the first and second members of the tractor-trailer over the second inter-member communication network between a third direct current waveform and a third alternating current waveform; and, controlling the third power line communication codec to encode and decode communications over the third alternating current waveform and exchange communications between the fifth communication interface and the second member of the tractor-trailer over the second inter-member communication network.

20. The communications hub of claim 18, further comprising:

a second housing configured for mounting on the first member of the tractor-trailer;

a fourth communication interface supported on the second housing and configured for connection with the electrical connection between the first and second members of the tractor-trailer;

a fifth communication interface supported on the second housing and configured to transmit and receive communications over a third intra-member communication network on the first member of the tractor-trailer in accordance with one of the first communication protocol, the second communication protocol and a third communication protocol;

a sixth communication interface supported on the second housing and configured for communication with the first communication interface and the fourth communication interface;

a third power converter supported within the second housing; and, a third power line communication codec supported within the second housing wherein the first control means is further configured for establishing the second inter-member communication network between the first and second members of the tractor-trailer over the third conductor of the electrical connection and the one of the second conductor and the fourth conductor of the electrical connection;

controlling the third power converter to convert a third power signal transmitted between the first and second members of the tractor-trailer over the second inter-member communication network between a third direct current waveform and a third alternating current waveform; and, controlling the third power line communication codec to encode and decode communications over the third alternating current waveform and exchange communications between the fifth communication interface and the second member of the tractor-trailer over the second inter-member communication network.

21. A method for transmitting and receiving communications formed using a plurality of different communication protocols between first and second members of a tractor-trailer over an electrical connection between the first and second members of the tractor-trailer, the electrical connection configured to comply with electrical requirements of the SAE J560 standard as it exists on the filing date of this application, comprising:

establishing a first inter-member communication network between the first and second members of the tractor-trailer over first and second conductors of the electrical connection;

controlling a first power converter to convert a first power signal transmitted between the first and second members of the tractor-trailer over the first inter-member communication network between a first direct current waveform and a first alternating current waveform; and, controlling a first power line communication codec to encode and decode communications over the first alternating current waveform and exchange communications between a first communication interface and the second member of the tractor-trailer over the first inter-member communication network, the first communication interface configured transmit and receive communications over a first intra-member communication network on the first member of the tractor-trailer in accordance with a first communication protocol further comprising controlling the first power line communication codec to encode and decode communications over the first alternating current waveform and exchange communications between a second communication interface and the second member of the tractor-trailer over the first inter-member communication network, the second communication interface configured to transmit and receive communications over a second intra-member communication network on the first member of the tractor-trailer in accordance with a second communication protocol different from the first communication protocol further comprising ordering the communications between the first communication interface and the second member of the tractor-trailer and the communications between the second communication interface and the second member of the tractor-trailer in accordance with a condition relating to operation of the tractor-trailer.

22. The method of claim 21, further comprising:

establishing a second inter-member communication network between the first and second members of the tractor-trailer over a third conductor and one of the second conductor and a fourth conductor of the electrical connection;

controlling a second power converter to convert a second power signal transmitted between the first and second members of the tractor-trailer over the second inter-member communication network between a second direct current waveform and a second alternating current waveform; and, controlling a second power line communication codec to encode and decode communications over the second alternating current waveform and exchange communications between a third communication interface and the second member of the tractor-trailer over the second inter-member communication network, the third communication interface configured to transmit and receive communications over a third intra-member communication network on the first member of the tractor-trailer in accordance with a third communication protocol different from the first communication protocol.

23. The method of claim 22, further comprising ordering the communications between the second communication interface and the second member of the tractor-trailer and the communications between the third communication interface and the second member of the tractor-trailer in accordance with the condition relating to operation of the tractor-trailer.

* * * * *